(12) United States Patent
Pham et al.

(10) Patent No.: US 10,091,166 B2
(45) Date of Patent: Oct. 2, 2018

(54) SEQUENTIALLY SERVING NETWORK SECURITY DEVICES USING A SOFTWARE DEFINED NETWORKING (SDN) SWITCH

(71) Applicant: Fortinet, Inc., Sunnyvale, CA (US)

(72) Inventors: Son Pham, San Jose, CA (US); Donald Krall, San Jose, CA (US); Venkateswara Adusumilli, San Jose, CA (US); Edward Lopez, South Riding, VA (US); Neil Huynh, Fremont, CA (US)

(73) Assignee: Fortinet, Inc., Sunnyvale, CA (US)

( * ) Notice: Subject to any disclaimer, the term of this patent is extended or adjusted under 35 U.S.C. 154(b) by 192 days.

(21) Appl. No.: 14/985,827

(22) Filed: Dec. 31, 2015

(65) Prior Publication Data

US 2017/0195292 A1 Jul. 6, 2017

(51) Int. Cl.
| | |
|---|---|
| *H04L 29/06* | (2006.01) |
| *H04L 12/24* | (2006.01) |
| *H04L 12/947* | (2013.01) |
| *H04L 12/935* | (2013.01) |

(52) U.S. Cl.
CPC .......... *H04L 63/0245* (2013.01); *H04L 41/20* (2013.01); *H04L 49/25* (2013.01); *H04L 49/30* (2013.01); *H04L 63/0263* (2013.01)

(58) Field of Classification Search
CPC ..... H04L 63/0245; H04L 41/20; H04L 49/25; H04L 49/30; H04L 63/0263
USPC .......................................................... 726/13
See application file for complete search history.

(56) References Cited

U.S. PATENT DOCUMENTS

| | | |
|---|---|---|
| 7,539,845 B1 | 5/2009 | Wentzlaff et al. |
| 9,269,439 B1 | 2/2016 | Levy et al. |
| 9,407,549 B2 * | 8/2016 | Mosko ................ H04L 45/7453 |
| 9,565,135 B2 | 2/2017 | Li et al. |
| 9,692,689 B2 | 6/2017 | Arumugam et al. |
| 2013/0230047 A1 | 9/2013 | Subrahmaniam et al. |
| 2014/0241356 A1 | 8/2014 | Zhang et al. |

(Continued)

OTHER PUBLICATIONS

"OpenFlow Switch Specification." Open Networking Foundation. Oct. 14, 2013. 206 pgs.

(Continued)

*Primary Examiner* — Kambiz Zand
*Assistant Examiner* — Benjamin Kaplan
(74) *Attorney, Agent, or Firm* — Hamilton, DeSanctis & Cha LLP

(57) ABSTRACT

Systems and methods for an SDN switch that provides service group chaining for sequentially serving multiple network security devices are provided. According to one embodiment, a packet received by the switch is processed by a first FPU based on a first set of rules and forwarded conditionally to a first security device. The packet is security processed, including dropping it or forwarding it to an egress port or forwarding it to a second FPU. When forwarded to the second FPU, the packet is processed based on a second set of rules by forwarding it to a second security device or dropping it or forwarding it to the egress port. When forwarded to the second security device, the packet is security processed, including dropping it or forwarding it to the egress port or conditionally forwarding it to a third FPU to be sequentially forwarded to a third security device.

10 Claims, 8 Drawing Sheets

(56) References Cited

U.S. PATENT DOCUMENTS

| | | | |
|---|---|---|---|
| 2015/0026800 A1* | 1/2015 | Jain | H04L 63/1458 |
| | | | 726/22 |
| 2015/0180783 A1 | 6/2015 | Crasta et al. | |
| 2016/0065452 A1 | 3/2016 | Kruglick | |
| 2016/0072717 A1 | 3/2016 | Ansari et al. | |
| 2016/0094449 A1 | 3/2016 | Ramia et al. | |
| 2016/0094460 A1 | 3/2016 | Shelar et al. | |
| 2016/0182378 A1 | 6/2016 | Basavaraja et al. | |
| 2016/0218973 A1 | 7/2016 | Anand et al. | |
| 2016/0301603 A1* | 10/2016 | Park | H04L 45/586 |
| 2016/0315880 A1 | 10/2016 | Guo et al. | |
| 2017/0041230 A1 | 2/2017 | Huang et al. | |
| 2017/0149640 A1 | 5/2017 | Narayanan et al. | |
| 2017/0180234 A1* | 6/2017 | Agrawal | H04L 63/1458 |
| 2017/0195253 A1 | 7/2017 | Annaluru et al. | |
| 2017/0195254 A1 | 7/2017 | Pham et al. | |
| 2017/0195255 A1 | 7/2017 | Pham et al. | |
| 2017/0195257 A1 | 7/2017 | Annaluru et al. | |

OTHER PUBLICATIONS

Non-Final Rejection for U.S. Appl. No. 14/985,746 dated Jul. 13, 2017.

Non-Final Rejection for U.S. Appl. No. 14/985,783 dated Oct. 6, 2017.

Non-Final Rejection for U.S. Appl. No. 14/985,819 dated Aug. 25, 2017.

* cited by examiner

SEQUENTIALLY SERVING NETWORK SECURITY DEVICES USING A SOFTWARE DEFINED NETWORKING (SDN) SWITCH

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2015, Fortinet, Inc.

BACKGROUND

Field

Embodiments of the present invention generally relate to software-defined networking (SDN). In particular, embodiments of the present invention relate to an SDN switch configured to provide physical data path chaining or service group chaining to, among other things, sequentially serve multiple network security devices.

Description of the Related Art

Global Internet Protocol (IP) traffic has increased fivefold in the last five years, and is expected to increase another threefold over the next five years. As the number of mobile devices and other IP devices connecting to the Internet are growing very rapidly, data traffic that needs to be monitored and inspected by network security devices is also increasing. Such increasing data traffic from different types of devices is creating new vulnerabilities that need to be monitored/inspected and controlled by the network security devices. As new types of network security issues are emerging, the network security devices need to include new policy rules to monitor and control the data traffic to/from a secured network. It is becoming difficult for hardware based switches or network security devices to provide the required scalability for rapidly increasing data traffic and increasing policy rules. To overcome the limitations of the hardware based switches or network security devices, which lack the flexibility of incorporating new and different forwarding rules, SDN devices that allow updates at regular intervals have been proposed for providing scalable and fast processing of network packets. With such features, typical SDN devices, e.g., SDN switches, are moving to replace, and are being configured to work in conjunction with traditional routers and switches in several high end applications, including the emerging cloud and datacenter environments where high volumes of traffic need to be monitored and filtered. SDN is an approach to computer networking that allows network administrators to manage network services through abstraction of lower-level functionality. This is done by decoupling the operating system that makes decisions about where the traffic is sent (the control plane) from the underlying hardware systems that forward traffic to the selected destinations (the data plane).

One aspect of SDN is the separation or abstraction of the control plane from the data plane. A typical enterprise network device may have a controlling element and a forwarding element within the same box that implements the SDN features. The forwarding elements are configured to receive packets, do conversion(s) if required, and forward the packets to their respective destinations based on instructions received from the controlling elements. In implementation, forwarding elements (also referred to as the data plane) receive forwarding commands from the control plane, based on which instructions the forwarding elements (also referred to as the controller) make/take a forwarding decision to be implemented in the data plane. The control plane is typically a collection of software running within a router or within a switch that uses rules that are set to identify the packet received from traffic, decide appropriate actions to be taken on the packet, and conveys the control decision to the data plane such that the data plane knows where to forward the packet(s).

To allow communications between different network devices or SDN devices, the OpenFlow protocols, including but not limited to Open Networking Foundation (ONF), "OpenFlow Switch Specification" Version 1.5.0 (Protocol version 0x06), Dec. 19, 2014 (hereafter, the "OpenFlow Protocol"), which is hereby incorporated by reference in its entirety for all purposes, are now being used. The OpenFlow Protocol intends to provide access to the data plane of a network device or an SDN device to other network devices and SDN devices, in addition to providing a protocol for device configuration. The OpenFlow Protocol was defined to increase flexibility and programmability of networks/network devices in order to allow network administrators to more easily tailor network configurations to their needs. The OpenFlow Protocol requires an SDN switch to contain a series of associative flow tables. Each entry in a table may contain ternary values for a desired selection of packet fields (e.g., Media Access Control (MAC) source and destination addresses, IP source and destination addresses, Transmission Control Prototype (TCP) port numbers, and the like). The OpenFlow Protocol defines a number of standardized packet header fields for matching as well as allowing users to add their own custom fields. Table entries are in prioritized order, and for each individual packet processed by the SDN switch, the table entries are searched in order for a matching entry. The table entries can have ternary values to match a broad selection of packets, wherein when the first matching table entry is found within the flow table, a set of actions associated with the matching flow table entry is executed. This may modify fields of the packet, for example, by setting the MAC destination field to a new value, the tables may direct an SDN switch to output the packet to a particular switch port in a particular queue, or send it to an SDN software controller, or to drop the packet. It is generally intended that when the existing flow tables do not contain a matching flow table entry, the packet is sent to the controller, which may respond by installing rules within the switch to properly process subsequently received similar packets. This accomplishes the goal of control plane and data plane separation by having the SDN controller software make the decisions concerning what flow tables are to be installed, whereas the SDN switch simply follows the directives of the SDN controller instead of making complex behavioral decisions on its own. In general, existing SDN switches are configured to be able to flexibly match against packets, and directed by the matches, perform a comprehensive set of actions to modify the packet and decide what to do with it.

SDNs that use the OpenFlow Protocols provide a high degree of dynamic flexibility to define new rules to be used, and actions to be taken by the network security devices. SDN architectures that use the OpenFlow Protocol therefore leads to adaptation of more flexible system hardware architecture and implementation to enable quick turnkey solution(s) for concurrent deployment of various types of network applications. Flexibility is also required in terms of traffic volume that the SDN controller and attached SDN switches can handle. As we know, dataflow in a network may be related/associated with different types of applications, and therefore data flow packets need different levels of treatment by the SDN switches and/or by network security devices. It is therefore desired that traffic received by the SDN switches be forwarded conditionally, evenly, and efficiently to one or more application devices such as network security devices.

In a typical data center deployment, a variety of security checks may need to be performed at different levels by different network security devices. Most of the traffic originating, transiting, or terminating in the data center is therefore subject to treatment by multiple security checks. Servicing of data center network traffic involves directing the traffic through a series of service functions to be performed by different security devices, which may be located at different places in the network or within a single device connected to the network or any combination thereof. Delivery of multiple service functions in a particular order within a datacenter (or among multiple data centers) creates many demands on the overall service delivery architecture. Such architectures may be referred to as service function chaining (a/k/a service group chaining) architectures while the list of service functions applied to the traffic is a Service Function Chain (SFC). A novel SDN switch architecture is needed to facilitate efficient utilization of the SDN switch, its flow processing unit(s) and/or multiple network security devices coupled to the SDN switch in the context of a service group chaining architecture.

SUMMARY

Systems and methods are described for an SDN switch that provides physical data path chaining or service group chaining to facilitate sequentially serving two or more network security/application devices. According to one embodiment, a software defined networking (SDN) switch receives a packet. The received packet is processed by a first flow processing unit (FPU) of multiple FPUs of the SDN switch based on a first set of one or more rules defined by an SDN controller to which the SDN switch is operatively coupled and forwarded conditionally to a first security device. A first type of security processing is performed on the received packet by the first security device, including either (i) dropping the received packet or forwarding the received packet to an egress port of the SDN switch or (ii) forwarding the received packet to a second FPU of the SDN switch. When the received packet is forwarded to the second FPU, the received packet is processed by the second FPU based on a second set of one or more rules defined by the SDN controller by either (i) forwarding the received packet to a second security device or (ii) dropping the received packet or forwarding the received packet to the egress port. When the received packet is forwarded to the second security device, a second type of security processing is performed on the received packet, including either (i) dropping the received packet or forwarding the received packet to the egress port or (ii) conditionally forwarding the received packet to a third FPU of the SDN switch to be sequentially forwarded to a third security device.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1A:
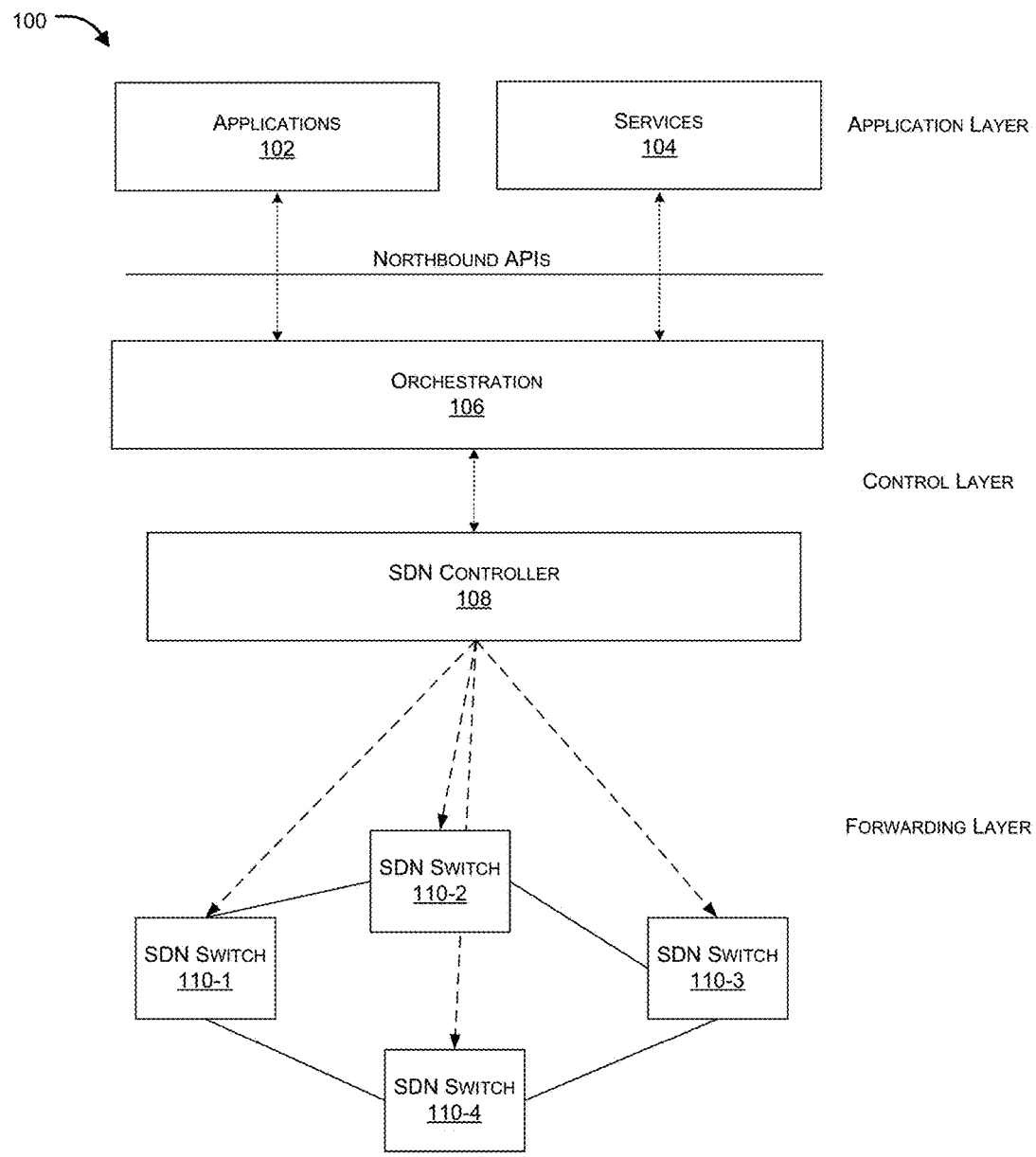
FIG. 1A illustrates an exemplary SDN architecture designed in accordance with an embodiment of the present disclosure.

Systems and methods are described for an SDN switch that provides physical data path chaining or service group chaining to facilitate sequentially serving two or more network security/application devices. Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) toper form a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

If the specification states a component or feature "may", "can", "could", or "might" be included or have a characteristic, that particular component or feature is not required to be included or have the characteristic.

Although the present disclosure has been described with the purpose of sequential servicing of network devices (such as network security/application devices) in SDN architectures, it should be appreciated that the same has been done merely to illustrate the disclosure in an exemplary manner and any other purpose or function for which the explained structure or configuration can be used, is covered within the scope of the present disclosure.

Exemplary embodiments will now be described more fully hereinafter with reference to the accompanying drawings, in which exemplary embodiments are shown. This disclosure may, however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named embodiment/example/specifics.

Embodiments of the present disclosure generally relate to a SDN architecture. In particular, embodiments of the present disclosure relate to an SDN switch configured to provide physical data path chaining or service group chaining for sequentially serving two or more network security devices. The SDN switch may include a packet receive module that can be configured to receive a packet to be forwarded to a first of multiple flow processing units (FPUs) of the SDN switch. The SDN switch can further include a first FPU based packet processing module that can be configured to apply to the received packet one or more rules defined by an SDN controller to which the SDN switch is operatively coupled and to forward the packet conditionally to a first network security device. The SDN switch can further include a first security device based packet processing module that can be configured to enable the first network security device to (i) process the packet and either drop the packet or forward the packet to an egress port or (ii) forward the received packet to a second FPU of the SDN switch. The SDN switch can further include a second FPU based packet processing module configured to examine the packet and either (i) forward the packet to a second network security device or (ii) drop the packet or forward the packet to the egress port. The SDN switch can further include a second security device based packet processing module that can be configured to enable the second network security device to (i) process the packet and either drop the packet or forward the packet to the egress port or (ii) conditionally forward the received packet to a third FPU to be sequentially forwarded to a third network security device.

In an aspect, the first FPU, the second FPU and the third FPU can be Field Programmable Gateway Array (FPGA) based processing units. In another aspect, the first network security device and the second network security device and the third network security device may be any or a combination of an Intrusion Prevention System (IPS), Intrusion Detection System (IDS), a gateway device, a network controller device, a firewall and a Distributed Denial of Service (DDoS) prevention device.

In another aspect, the third FPU can forward the packet to the third network security device if the third network security device exists; otherwise, the packet can be forwarded to the egress port. In another aspect, when the first network security device does not exist, the first FPU can forward the packet to the egress port. Depending upon the particular implementation, each network security device can be associated with a particular FPU. Alternatively, each network security device can be dynamically mapped for packet processing with an FPU of the SDN switch in a round robin manner. In yet another embodiment, each network security device can be dynamically associated with one or more FPUs based on the relative processing loads of the FPUs of the SDN switch.

FIG. 1A illustrates an exemplary SDN architecture 100 designed in accordance with an embodiment of the present invention. SDN architecture 100 can be used for service group chaining by SDN switches 110 to sequentially service two or more network security devices (not shown) by performing physical data path chaining using software defined rules and/or FPGA support logic, for example. As those skilled in the art are aware, SDN is a way to describe abstracting network functions in order to control network security functions by SDN switches 110. SDN decouples operating system functions that gather forwarding table information from forwarding hardware, and abstracts the functionality of legacy hardware into three layers (e.g., as application layer, a control layer, and a forwarding layer). The control plane applications that implement network routing and switching functionalities are completely separated from the forwarding plane, thus maintaining a centralized control plane, which enables highly customized and optimized networking services to be tailored to specific user needs or specific network environments. A centralized control plane provides a highly scalable, reliable, and flexible networking infrastructure that can cater to diverse user needs. While embodiments of the present invention are described with reference to a centralized control plane, it is specifically contemplated that a localized control plane may be used for configuring the SDN switches. In an exemplary implementation, SDN switches such as SDN switch 110-1, SDN switch 110-2, SDN switch 110-3, and SDN switch 110-4, which may be collectively and interchangeably referred to as SDN switches 110 or as OpenFlow switches 110 or simply as switches hereinafter, can be configured to use the OpenFlow Protocol as part of SDN architecture 100. In an exemplary implementation, SDN switches 110 can be programmed to define how to match packets with configured existing rules, and how to forward the packets based on one or more configurable/programmable rules. SDN switches 110 can be programmed to switch packets to/from the network security devices. In a typical implementation, when a data packet is received from real-time traffic, SDN switch 110 determines one or more pipelines to be used for forwarding the packet towards the destination. When SDN switch 110 observes an unknown flow and/or cannot determine how to forward the packet, SDN switch 110 may consult SDN controller 108 to determine what to do with the flow, and based on the configuration received from SDN controller 108, SDN switch 110 can make an appropriate decision. In general, SDN switches 110 may include multiple tables, e.g., flow tables, (not shown) for storing the rules based on which forwarding decisions are made. In an exemplary implementation, the multiple tables of SDN switches 110 can generally be stored in an appropriate data store or memory space.

In an exemplary implementation, the application layer can include one or more applications 102, and one or more network services 104 that can be used to determine forwarding requirements. Further, the control layer can convert the forwarding requirements/information into flow programmable statements by using Orchestration 106. On receiving the forwarding requirements/information from the upper layer, SDN controller 108 operable within the control layer can configure and program flows into the OpenFlow switches 110 using the OpenFlow Protocol.

In an exemplary aspect, virtual Border Gatewal Protocol (BGP) routing instances may run in the application layer by applications 102 or by services 104, and can dynamically modify programmed flows delivered to the OpenFlow-enabled SDN switches 110.

In an aspect, SDN architecture 100 can be used to meet the performance requirements to inspect traffic on high-performance 40 G and 100 G links beyond Layer 4. SDN architecture 100 can be configured to meet performance gate requirements of high speed network links while intelligently shunting traffic-of-interest for associated network security processing and meeting aggregate network security and performance requirements.

In an exemplary implementation, SDN controller 108 can be configured to support flow programming and provide superflow-to-flow abstraction, and other future orchestration features. SDN controller 108 can provide an ability parse a superflow into individual flows supported within the SDN appliances (e.g., SDN switches 110). In an exemplary implementation, orchestration engine 106 can implemented with SDN controller 108 or can be implemented as an independent network device. While described herein in the context of the OpenFlow Protocol, SDN architecture 100, including SDN controller 108 and SDN switches 110 may also implement the methods described herein using other ONF OpenFlow specifications, including, but not limited to any OpenFlow Switch Specification having version 1.3 or greater.

In an exemplary implementation, SDN controller 108 can configure SDN switches 110 to perform service function chaining for sequentially performing two or more security functions provided by multiple network security devices coupled to SDN switches 110. Those skilled in the art will appreciate that although embodiments of the present invention are described herein with respect to servicing of two or more network security devices, the serviced devices can also be other types of network devices, including, but not limited to network/application devices.

According to one embodiment, SDN switches 110 can be configured with configurable rules to perform physical data path chaining for received packets. Each SDN switch 110 can be configured to include multiple flow processing units (FPUs) that can perform service group chaining. Although various examples described herein may be described with respect to a particular number of FPUs, more or fewer may be used depending upon the needs of the particular implementation. Once configured, SDN switches 110 can receive a packet at an ingress port, and can forward the packet to a first of multiple FPUs (not shown) of SDN switch 110. The first FPU of SDN switch 110 can then examine the received packet based on one or more rules defined by SDN controller 110 to forward the packet conditionally to a first network security/application device for service (e.g., performing security checks by a DDoS prevention device), or to a second security device (e.g., a network controller/firewall device) via a second FPU when the packet belongs to an active session, or can directly send the packet to an egress port or can even discard the packet based on the preconfigured rules stored in the SDN flow table of the first FPU. In an exemplary implementation, when the packet is sent to the first security/application device, the first security device can examine the packet to either drop the packet or to forward to an egress port, or can forward the received packet to a second FPU of SDN switch 110, wherein the second FPU of SDN switch 110 can further examine the received packet and either forward the packet to a second security device, or drop the packet or forward the packet to the egress port based on flow table of the second FPU. On receiving the packet, the second security device can examine the packet and either drop the packet or forward the packet to the egress port, or can conditionally forward the received packet to a third FPU (if present) of SDN switch 110 to be sequentially forwarded to a third security device (if present) based on the flow table rules pertaining to the third FPU.

In an exemplary implementation, rules or data flow to be used by the SDN switches 110 for performing service group chaining can be defined by SDN controller 108. SDN switches 110 can be configured to perform service group chaining based on the software defined rules stored in the flow processing tables. In an aspect, the methods and systems described herein enable efficient sequential processing of packets by multiple network security/application devices such that, for instance, each network security/application device is mapped to one or more FPUs of SDN switch 110, and when the FPU receives a packet, it matches the same with respect to its flow table to decide whether to (i) send the packet to its one or more mapped security devices or (ii) drop the packet or forward the packet to the egress port of SDN switch 110. Similarly, while processing a packet, network security/application device can determine whether to drop the packet or forward the packet to egress port or whether the packet is to be forwarded to another network security/application device via another FPU that corresponds to the next network security/application device. In an exemplary embodiment, there can be a one-to-one mapping between network security/application devices and FPUs, or a many-to-one mapping or one-to-many relationship can be established between network security/application devices and FPUs in a manner such that two or more network security/application devices can be sequentially serviced, and packets can be conditionally sent to each network security/application device by its associated FPU. Alternatively, FPUs and network security devices may be dynamically associated using a load balancing approach and/or a round robin assignment of FPUs to network security devices.

Figure 1B:
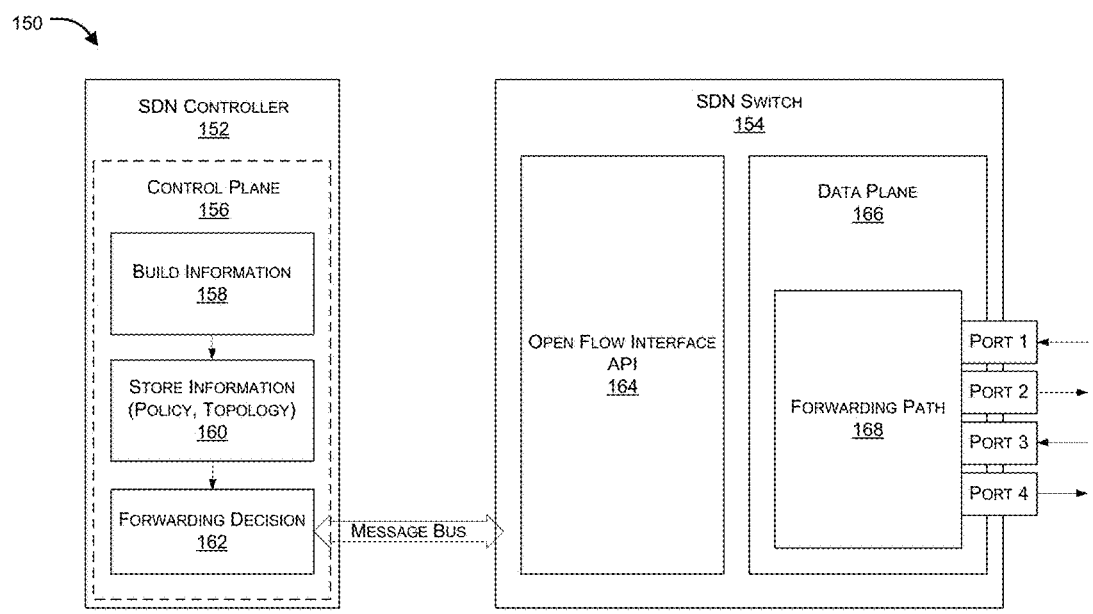
FIG. 1B illustrates an exemplary flexible data plane and control plane configuration of an SDN architecture that uses the OpenFlow Protocol in accordance with an embodiment of the present disclosure.

FIG. 1B illustrates an exemplary flexible data plane and control plane configuration of an SDN that uses the OpenFlow Protocol in accordance with an embodiment of the present invention. Different functionalities (e.g., rule/information building, storage of policy or network topology (in the case of a topology aware network), forwarding decision etc.) can be separated and assigned to either SDN controller 152 or SDN switch 154. In an exemplary implementation, a control plane 156 and a data plane 166 of the system can be separated so as to achieve a high level of scalability. Though there are different possible implementations in which different functions can be assigned either to SDN controller 152 or to SDN switch 154, in an exemplary implementation, all activities that are necessary to execution of data plane functions but do not involve transecting end-user data packets, making routing tables, setting packet handling policies, base station beacons announcing availability of services and the like, can be configured to be part of control plane 158, and all activities involving as well as resulting from data packets originated by client devices, including forwarding, fragmentation and reassembly, replication for multicasting and the like, can be configured in/for data plane 166.

As those skilled in the art will appreciate, the basic job of an SDN switch is to make forwarding decisions, which is considered to be a control plane activity, and subsequently forward the packet at issue toward its destination, which is considered to be a data plane activity. In an exemplary implementation, it is possible to configure SDN switches 154 to perform some control plane activities, particularly the forwarding decisions, in addition to performing data plane activities. However, in a specific implementation, activities of control plane 156, which include building information 158, store information 160, and making forwarding decisions 162 can be performed by SDN controller 152, and activities of data plane 166, which include assigning forwarding path 168 to packets can be performed by SDN switch 154. SDN switches that receive forwarding decisions from SDN controller 152 are generally referred to as externally controlled switches. In an exemplary implementation, forwarding decisions can be conveyed by SDN controller 152 to SDN switch 154 through a message bus. SDN switch 154 can be configured to provide an OpenFlow interface API 164, using which SDN controller 152 can track the status of SDN switch 154 and can communicate with SDN switch 154. Given that OpenFlow removes control plane responsibilities from SDN switch 154, it also removes scaling problems along with it, and shifts the burden upstream to a more scalable and centralized OpenFlow SDN controller 152. When controlled via the OpenFlow Protocol, SDN switch 154 itself may no longer have to make forwarding decisions, and therefore no longer needs to maintain information required to facilitate those decisions, and no longer needs to run processes required to build and maintain that information. All of that responsibility can be performed by SDN controller 152.

In an exemplary deployment model, service functions such as service function chaining, data path chaining, among others can be inserted on the data-forwarding path 168 between communicating peers. However, in alternative deployments, service functions, whether physical or virtualized, may reside on direct data forwarding path 168 and traffic can instead be steered through required service functions wherever they are deployed.

As those skilled in the art will appreciate, in different implementations, SDN controller 152 or SDN switch 154 can be configured to make forwarding decisions using preconfigured rule sets, which may be stored in flow tables. In an exemplary implementation, to make a forwarding decision, SDN controller 152 or SDN switch 154 can use flow tables stored within them. In an exemplary implementation, forwarding decisions can be made by SDN switch 154, and hence SDN switch 154 may store flow tables having multiple fields and entries. SDN switch 154 may store the forwarding information, which is generally stored in the form of OpenFlow flow tables, in specialized memory resources (e.g., Ternary-Content-Addressable Memory (TCAM) or Dynamic Random Access Memory (DRAM)) for making fast and efficient decisions. Sometimes, storing large forwarding information within SDN switch 154 may not be possible as specialized memories are generally costly, in which cases, the forwarding information can be stored with SDN controller 152 and the decisions can be made by SDN controller 152. The forwarding information can therefore be stored in the form of flow tables, either in SDN controller 152 or in SDN switch 154 depending on the particular implementation.

Figure 1C:
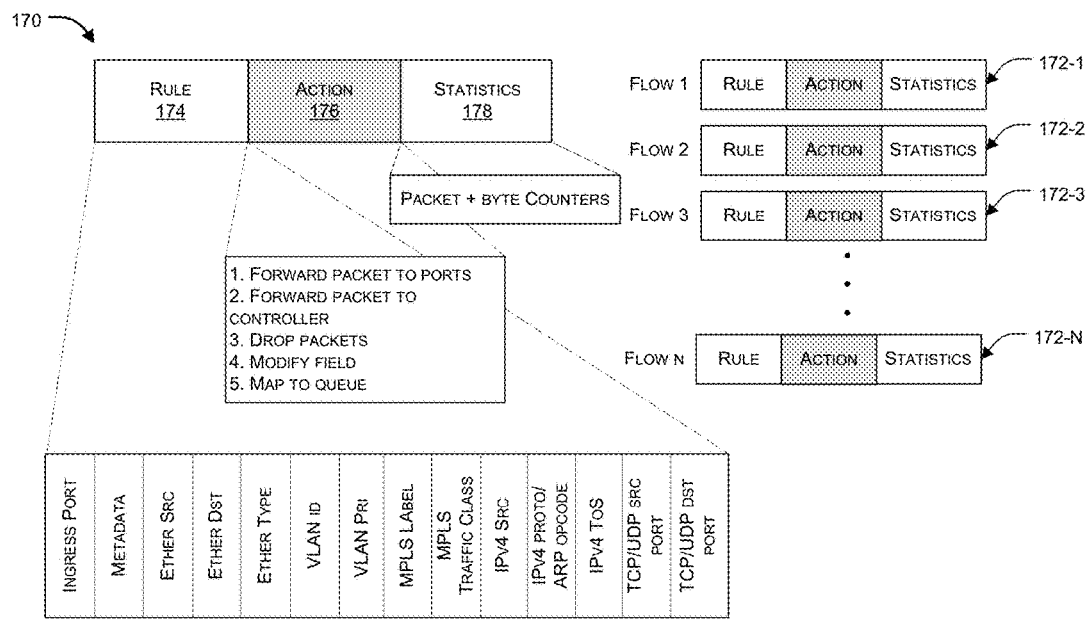
FIG. 1C illustrates exemplary flow table fields that can be used by SDN switches in accordance with an embodiment of the present disclosure.

FIG. 1C illustrates exemplary flow table fields that can be used by SDN switches in accordance with an embodiment of the present invention. In an exemplary implementation, data flow for one or more SDN switches can be defined and configured by an SDN controller, wherein the data flow can be configured by storing data flow information, also referred to as forwarding information, in the form of flow tables within the SDN switches. Incoming packets can be matched by the SDN switches against flow definitions/forwarding rules (e.g., rule 174) and, when a match is found, a set of actions (e.g., action 176) can be performed, and statistics 178 can be updated. Packets that do not match any flow table entry (e.g., entries 172-1, 172-2, 173-3 . . . 173-N) can be (typically) encapsulated and sent to the SDN controller, wherein the controller can decide how to process the packet and accordingly add a new rule (and corresponding entry) to flow table 170. Flow table 170 can be configured to be stored in high speed data plane at an OpenFlow-enabled SDN switch and may include multiple configurable entries/rules. Successive packets with the same flow identifier will be processed according to this new rule without contacting SDN controller. Therefore, while each packet is switched individually, the flow can be the basic unit of manipulation within the OpenFlow enabled SDN switch.

In an exemplary implementation, flow table 170 may have different fields, such as header, action, and statistics. The header field of flow table 170 may include check points/rules that are to be used for matching the details of received packets and the action fields contain the action(s) to be taken on the packet if a match is found. Fields of flow table 170 can be broadly classified as rule fields 174, action fields 176 and statistics 178. Rule fields 174 store the rules or parameters that can be used to identify appropriate entries in flow table 170 for the received packet header. Rules 174 are mostly defined based on header details of the packet, and may be a combination of one or more of ingress port, metadata, Ether source, Ether destination, Ether type, Virtual Local Area Network (VLAN) identifier (ID), VLAN Pri, Multiprotocol Label Switching (MPLS) label, MPLS traffic class, Internet Protocol version 4 (IPv4) source, IPv4 protocol and/or Address Resolution Protocol (ARP) OP code(s), Transmission Control Protocol (TCP)/User Datagram Protocol (UDP) source port, TCP/UDP destination port, among other fields of the packet header. Flow table 170 may include several entries representing different data flows, for example, flow 1 172-1, flow 2 172-2, flow-3 172-3, and flow N 172-N, which may be collectively and interchangeably referred to as data flow entries 172. Data flow entries 172 can be made in flow table 170 by SDN controller, and can be stored in one or more TCAMs and/or DRAMs of SDN switch(es). Each data flow entry 172 can include the rules 174 to be used for matching incoming data packets, actions 176 to be taken if the match is found, and statistics 178. For example, all packets that are addressed to a particular IP address and to a TCP/UDP port (i.e., web traffic) may define a particular flow (corresponding to a rule in flow table 170). Action 176 establishes the manner in which the packet will be processed depending on the rule 174. An exemplary action 176 may include "forward packet to ports" (defined port), "forward packet to controller", "drop packet", "modify field", "map to queue for performing data path chaining", among other like actions, all of which are well within the scope of the present disclosure. In an aspect, statistics 178 can gather packet related data (e.g., for use in connection with volume based billing or anti-DDoS), which can be used by network applications to make dynamic and/or automatic decisions. One potential use of statistics field 178 can be to establish a mechanism to set a lifetime for the flow entries. For example, duration counters can measure the amount of time that a flow has been installed in an SDN switch.

On receiving a packet, an SDN switch can try to find a match in flow table 170 using the header information of the packet, and determine an action to be taken on the received packet. SDN switch can be configured to perform data path chaining for received packets as described in further detail below.

Figure 2:
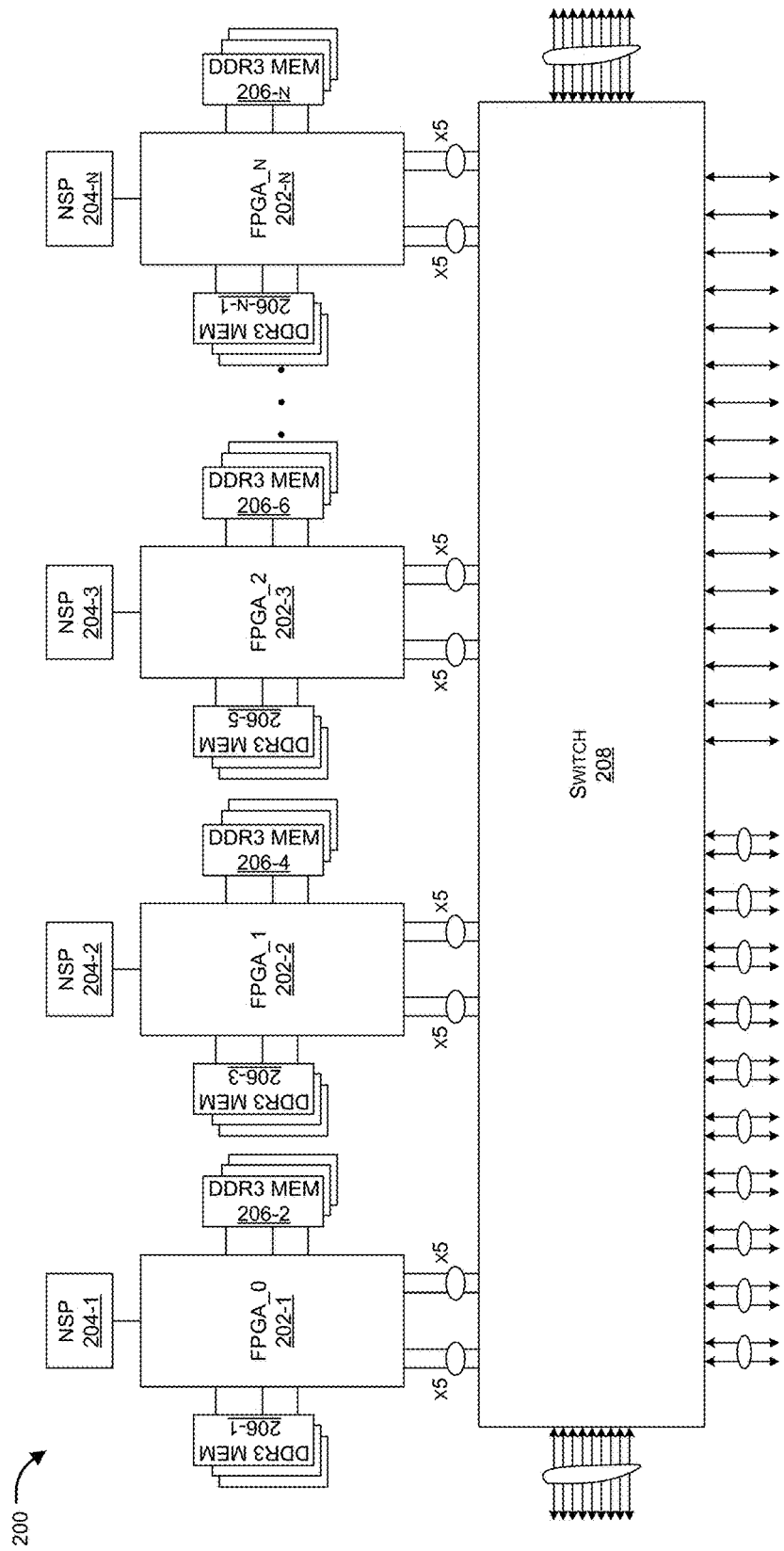
FIG. 2 illustrates an exemplary data path architecture to be used by an SDN switch in accordance with an embodiment of the present invention.

FIG. 2 illustrates an exemplary data path architecture of an SDN switch 200 in accordance with an embodiment of the present invention. In the context of the present example, SDN switch can include a switching fabric 208, ingress/egress ports, multiple FPUs such as FPGA_0 202-1, FPGA_1 202-2, FPGA_2 202-3 and FPGA_N 202-N, which may be referred to interchangeably and collectively as FPU 202 or FPUs 202 hereinafter, and multiple service ports with which different service devices may be connected. In an exemplary implementation, each FPU 202 of the switch 208 can be configured to include or be operatively coupled to a set of fast memory units. For example, FPGA_0 202-1 has DDR3 memory 206-1, DDR 3 memory 206-2, and a search processor/TCAM device 204-1. According to one embodiment, search processor(s) 204 may comprise NEURON Search Processors (NSPs). NEURON is a trademark or registered trademark of Cavium of San Jose, Calif. In an exemplary implementation, each FPU 202 can have one or more flow tables that can be stored in a memory device that the FPU 202 is associated with. On receiving a packet via an ingress port, SDN switch 200 can forward the packet (via switching fabric 208) to the first FPU FPGA_0 202-1, for instance, which can process the packet with respect to its respective flow table stored in memory in order to make a forwarding decision. In an exemplary implementation, FPU 202, for example FPGAs, may have internal memory resources for storing the flow tables.

In an aspect, SDN switch 200 can include multiple (e.g., N) FPUs 202 with internal resource partitions, allowing fast implementation of different modes of operations by SDN switch 200. For instance, FPUs 202 can be configured to transect network traffic to one or more corresponding ports as defined in the flow tables, use different tunneling protocols to direct/route/terminate traffic based on actions defined in respective flow table(s), perform network monitoring features such as flow based statistics collection function, perform session tracking for conditionally forwarding traffic to security/application device(s), or perform load balancing functions. SDN switch 200 can also be configured to provide service group chaining or data path chaining based on software defined rules as described further below.

Figure 3:
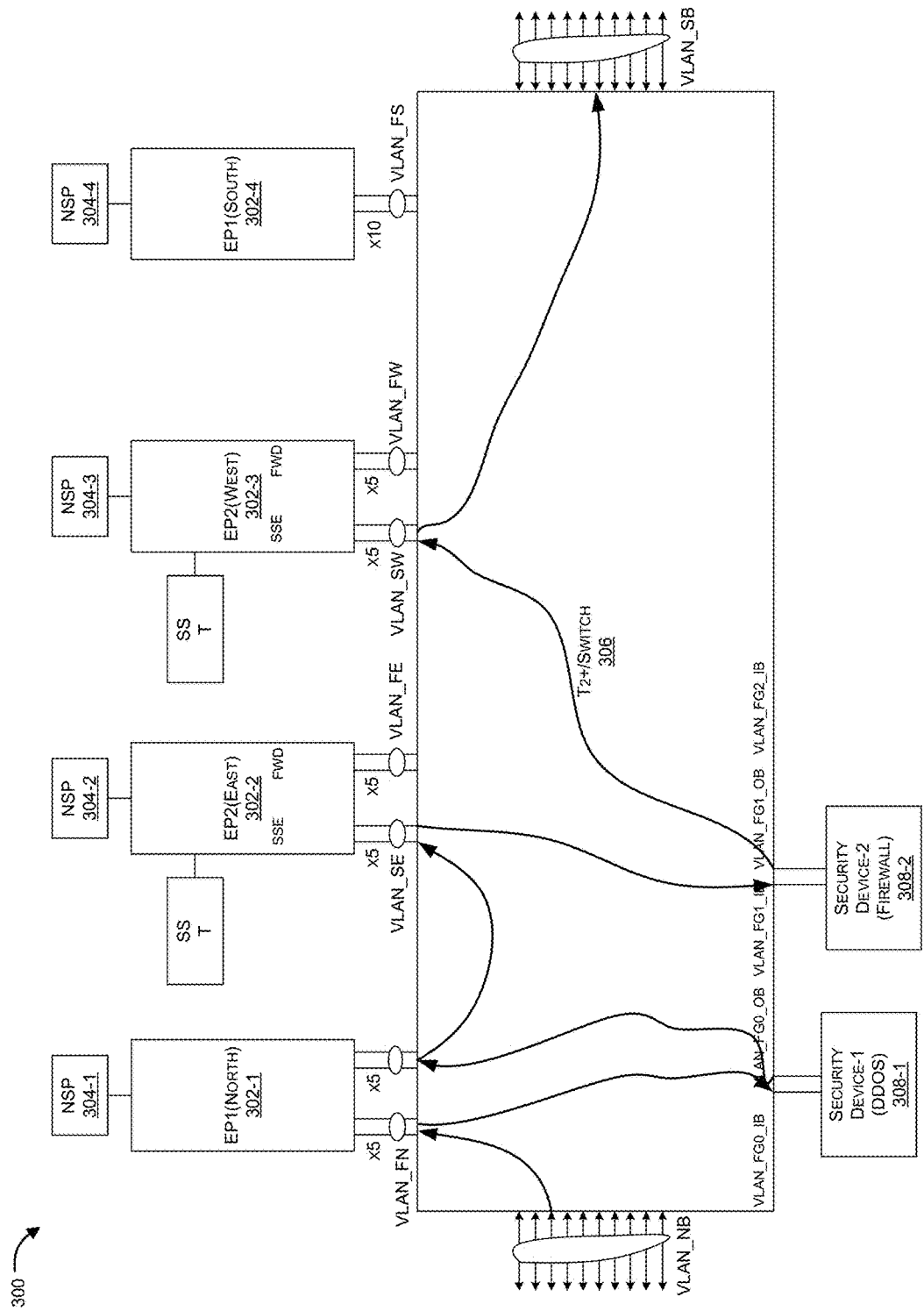
FIG. 3 illustrates an exemplary architecture of an SDN switch configured to provide data path chaining or service group chaining for sequentially serving multiple network security devices in accordance with an embodiment of the present invention.

FIG. 3 illustrates an exemplary architecture of an SDN switch 300 that is configured to provide data path chaining or service group chaining for sequentially serving one or more security/application functions by security/application devices in accordance with an embodiment of the present invention. Although the present example is described with reference to security devices, in alternative configurations other network devices can be incorporated.

In an exemplary implementation, switch 300 can include a switching fabric 306, which can be a T2+ device, and can be configured to perform service group chaining or physical data path chaining for sequentially servicing two or more security devices. In an aspect, logic for physical data path chaining or service group chaining can be stored within FPUs 302. In an exemplary implementation, physical data chaining can be performed using appropriate software defined rules or flows. As shown in FIG. 3, switch 300 can include multiple ingress ports (such as VLAN_NB), multiple egress ports (such as VLAN_SB), N number of FPUs such as EP1 (North) 302-1, EP2 (East) 302-2, EP2 (West) 302-3, and EP1 (South) 302-4, which may be collectively and interchangeably referred to as FPUs 302 hereinafter.

In an exemplary embodiment, FPUs 302 can be logically divided into two types, a first type (EP1 type), representing FPUs that have flow tables and are configured to receive incoming packets from ingress ports, and second type (EP2 type), representing FPUs that have flow tables and are configured to track sessions of the packet. Each FPU 302 can have an attached search processor (e.g., an NSP) 304 for storing respective flow tables. According to one embodiment, search processor 304 may include a NEURON Search Processor (NSP). NEURON is a trademark or registered trademark of Cavium of San Jose, Calif. In an exemplary implementation, the second type of FPU (EP2) can be configured to maintain a tracking session table for creating/managing/tracking sessions for one or more packets. In an exemplary implementation, SDN controller (not shown) can configure SDN switch 300 to perform service function chaining for servicing two or more security/application devices (e.g., security device-1 (DDoS protection device) 308-1 and security device-2 (firewall) 308-2.

In an implementation, SDN switch 300 can refer to configurable rules to perform physical data path chaining for received packets. Once configured, SDN switch 300 can receive a packet at an ingress port and forward the packet to a first FPU, for example EP1 (North) 302-1 of SDN switch 300. The first FPU, EP1 (North) 302-1, can process the received packet based on one or more rules stored in its flow table to forward the packet conditionally to a first security device, e.g., security device-1 308-1, for service (e.g., performing DDoS security checks), or to a second security device, e.g., security device-2 308-2 via a second FPU, say EP2 (East) 302-2, when the packet belongs to an active session, or can directly forward the packet to an egress port (e.g., VLAN_SB) based on preconfigured rules stored in its respective flow table(s). In an exemplary implementation, the first security device, for example, security device-1 308-1, can examine/filter/process the packet to either drop the packet or to forward the packet via an egress port (such as VLAN_SB), or can forward the received packet to a second FPU, e.g., EP2 (East) 302-2 of SDN switch 300. The second FPU EP2 (East) 302-2 can examine the received packet and either forwards the packet to a second security device, e.g., security device-2 308-2, or can drop or can forward the packet via the egress port (VLAN_SB) (say, via a third FPU, e.g., EP2 (West) 302-3, or directly to the egress port). On receiving the packet, the second security device 308-2 can examine the packet, and can either drop the packet or forward the same to the egress port, or can conditionally forward the received packet to a third FPU (if any) of SDN switch 300 to be sequentially forwarded to a third security device (if any) based on the rules stored in the flow table(s) of the third FPU. In an exemplary implementation, the second FPU EP2 (East) 302-2 and EP2 (West) 302-3 can be configured to track active sessions, and forward the packet and/or perform service group chaining or physical data path chaining for the received packet based on the active sessions. In an aspect, embodiments of the present invention enable sequential processing of received packets by multiple security devices, wherein the packet can first be processed/filtered/examined by a first security device 308-1 and then be sent to a second security device 308-2 (via the second FPU 302-2). Similarly, when a third security device 308-3 is present/coupled, the packet can be forwarded to the third security device (not shown) via a third flow processing unit, e.g., FPU 302-3 or any other mapped/configured FPU 302-3.

As one skilled in the art will appreciate, Service Function Chaining (SFC) enables creation of composite services that can include an ordered set of Service Functions (SFs) that are to be applied to packets and/or to frames selected as a result of classification by SDN switch 300. SFC is a concept that provides for more than just the application of an ordered set of SFs to selected traffic; rather, it describes a method for deploying SFs in a way that enables dynamic ordering and topological independence of those SFs as well as the exchange of metadata between participating entities. For a given service, an abstracted view of the required service functions and the order in which they are to be applied, referred to herein as service group chaining, can be managed by SDN switch 300. In an exemplary implementation, service group chaining can be instantiated through selection of specific service function instances by SDN switch 300 to form a service graph, called a Service Function Path (SFP). In an exemplary implementation, SDN switch 300 through the software defined rules can provide an abstraction of the services (e.g., security checks) to be performed on the received packet and sequence of service functions to be performed on the received packet by different security devices. In an exemplary implementation, service delivery and sequence can be configured by an SDN controller using the software defined rules and the OpenFlow Protocol.

While FIG. 3 has been explained with reference to VLAN_NB acting as an ingress port through which North-Bound (NB) packets are received, and with VLAN_SB acting as an egress port, the configuration can be reciprocal/opposite, wherein southbound packets can also be received at VLAN_SB and sent to EP1 (South) 302-4, which can then, based on a matching flow table rule, either send the packet to a security device 308-1 or when a session is to be tracked, can send the packet to the security device 308-2, or to any other configured security device(s) 308. In another case, the packet either be dropped or forwarded to the default egress port VLAN_NB, wherein all such forwarding decisions are taken based on flow table matching step. Packets can therefore be sent to Type 2 FPUs (EP2) when they are to be checked for session tracking, as a result of session-based security/application devices can be associated with Type 2 FPUs (EP2) and security devices that are not impacted by session integrity/tracking can be associated with Type-1 (EP1) FPU/FPGAs, for instance.

Figure 4:
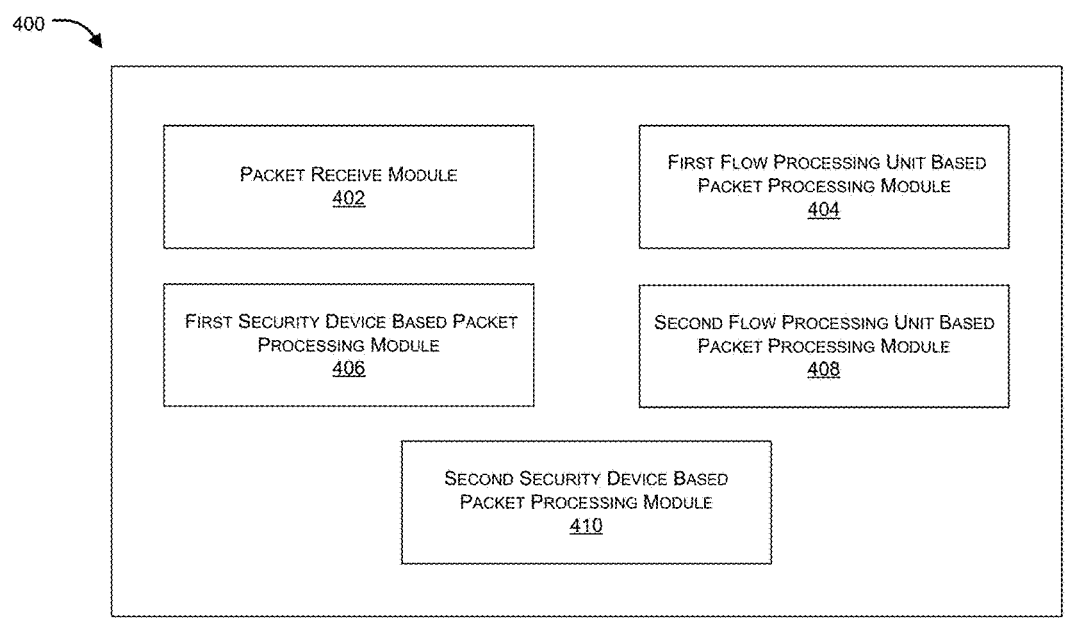
FIG. 4 illustrates an exemplary functional module diagram of an SDN switch that provides data path chaining for sequentially serving multiple network security devices in accordance with an embodiment of the present invention.

FIG. 4 illustrates an exemplary functional module diagram of an SDN switch 400 that provides data path chaining for sequentially serving one or more security/application devices in accordance with an embodiment of the present invention. In an aspect, SDN switch performs service group chaining and providing an abstract view of service functions to be performed on a received packet. In an exemplary implementation, service group chaining can be performed by SDN switch 400 with the help of software defined flows. In an exemplary implementation, SDN switch 400 can include a packet receive module 402 that can be configured to receive a packet to be forwarded to a first flow processing unit of SDN switch 400.

SDN switch 400 can further include a first FPU based packet processing module 404 configured to examine the received packet based on one or more rules defined by an SDN controller to which SDN switch 400 is operatively coupled, and to forward the packet conditionally to a first security device. Therefore, when the flow table indicates that the packet is to be processed by a DDoS security device, the first FPU can send the packet to the security device or can perform any other action indicated by the flow table.

SDN switch 400 can further include a first security device based packet processing module 406 configured to enable the first security device to examine/filter/process the packet to either drop the packet or forward to an egress port, or to forward the received packet to a second FPU. In an instance, the second FPU is an EP2 type FPU, and in case the first security device determines that the packet is to be processed by a session-tracking based security device (e.g. a second security device), it can send the packet to the second FPU, which can then conditionally forward the packet to the second security device.

SDN switch 400 can further include a second FPU based packet processing module 408 configured to examine the packet, and either forward the packet to the second security device, or to drop the packet or forward the packet to the egress port. SDN switch 400 can further include a second security device based packet processing module 410 configured to enable the second security device to examine/filter/process the packet, and either drop the packet or forward the packet to the egress port, or conditionally forward the received packet to a third FPU (if any) to be sequentially forwarded to a third security device (if any). In an aspect, the third FPU can forward the packet to the third security device if the third security device exists, else the packet is forwarded to the egress port. In this manner, the received packet can be sequentially processed by any number and type of network security devices as may be appropriate for the particular implementation.

In an aspect, the packet can be sent by the second FPU to the second security device only if a session with which the packet is associated is to be tracked, wherein the packets, at the second FPU, can be examined and checked for eligibility of session tracking such that if the condition of session tracking is met, the packets are transferred to the second security device else they can dropped to sent to the egress port.

In an exemplary implementation, the first FPU, the second FPU, and the third FPU are Field Programmable Gateway Array (FPGA) based processing units. In another exemplary implementation, the first security device, the second security device, and the third security device can be selected from any or from a combination of an Intrusion Prevention System (IPS), Intrusion Detection System (IDS), gateway device, network controller device, Firewall, Distributed Denial of Service (DDoS) prevention device, and a network security device.

In an exemplary implementation, each security device can be mapped for packet processing with one FPU, wherein such mapping can be done in a round robin manner for the FPUs of SDN switch. In another embodiment, SDN switch can forward the packet to any suitable security device using round robin selection. In another exemplary implementation, FPUs can forward a packet to a suitable security device based on observed loads of respective security devices. In a preferred implementation, a FPU can forward a packet to a security device having least load. In another exemplary implementation, logic or rules for service group chaining or data path chaining can be configured at SDN switch by an SDN controller, wherein system of the present disclosure allows SDN controller to define flow path for enabling service group chaining. Flow tables of the FPUs can include actions to be taken on the received packet, wherein, these actions may be related to the service group chaining.

Figure 5:
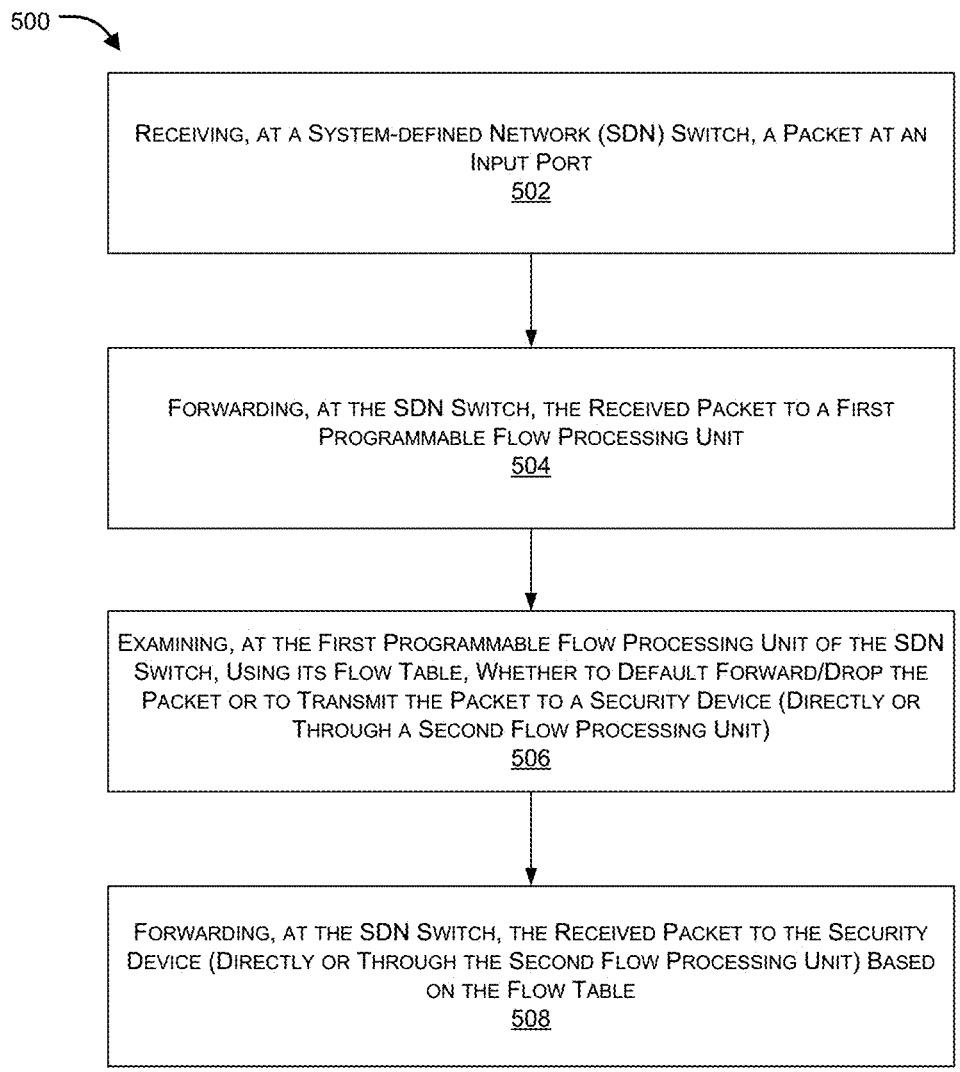
FIG. 5 illustrates an exemplary flow diagram showing data path chaining for sequentially serving multiple network security devices in accordance with an embodiment of the present invention.

FIG. 5 illustrates an exemplary flow diagram 500 of data path chaining for sequentially serving one or more security devices in accordance with an embodiment of the present invention. At block 502, a packet is received at an SDN switch at an input/ingress port (e.g., VLAN_NB), and at block 504, the packet is forwarded to a first FPU. At block 506, the first FPU, referring to its respective flow table, can examine/process the received packet to determine whether the packet is to be dropped, default forwarded to an egress port (e.g., VLAN_SB), sent to a first security device for security processing, or sent to a second security device (e.g., for session tracking) through a second FPU. At block 508 the first FPU, based on the outcome of block 506, may forward the packet to a security device (e.g., the first or the second security device) based on locating a matching flow entry in the flow table of the first FPU.

Figure 6:
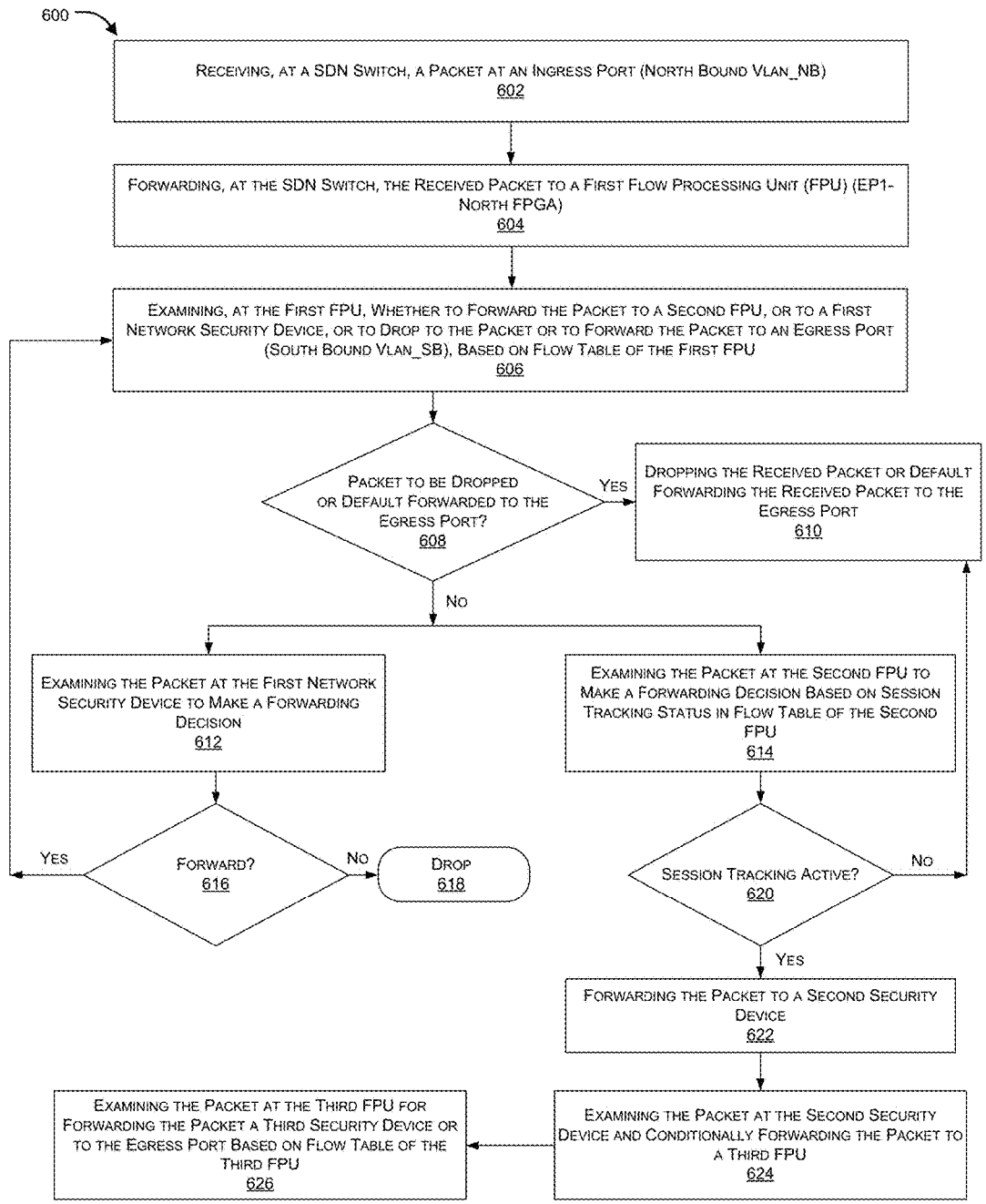
FIG. 6 illustrates an exemplary flow diagram showing data path chaining for sequentially serving multiple network security devices in accordance with another embodiment of the present invention.

FIG. 6 illustrates an exemplary flow diagram 600 showing data path chaining for sequentially serving one or more security devices in accordance with another embodiment of the present invention. At block 602, an SDN switch receives a packet at an ingress port, say a northbound (NB) port. At block 604, the received packet is forwarded to a first FPU that is associated with the NB port, and at block 606, the first FPU can determine, based on identifying a flow table entry within its flow table(s) that matches the packet attributes, whether to forward the packet to a second FPU (for instance when a session is to be tracked), or whether to forward the packet to a first security device, or whether to drop/default forward the packet to an egress port (such as southbound (SB) port).

At block 608, it is determined whether the packet is to be dropped/forwarded to the egress port, which upon an affirmative determination, at block 610, the packet is dropped or default forwarded to the egress port; otherwise, at block 612, either the packet is sent to the first network security device for processing or at block 614, the packet is sent to the second FPU and processed by the second FPU based on its flow table to confirm whether session tracking is to be performed.

In an aspect, at block 612, the first network security device processes the packet and then at block 616 determines whether the packet is to be forwarded. Upon an affirmative determination, processing continues with block 606 where the packet is forwarded to the first FPU; otherwise, the packet can be dropped at block 618. On the other hand, at block 614, the packet can be examined by the second FPU to confirm whether the packet is to be session tracked, wherein if at block 620, it is determined that session tracking is active, the packet can be sent to a second network security device at block 622; otherwise, the packet can be dropped/default forwarded to the egress port at block 610. At block 624, the packet can be examined/processed at the second network security device, and can be either be sent to a third FPU (if any) for further sequential processing at a third network security device (if any); otherwise, the packet can be sent back to the second FPU (for instance) and dropped/default forwarded at that stage. When the packet is sent to the third FPU, at block 626, the third FPU can either transmit the packet to a third network security device (if any); otherwise, it can drop/default forward the packet to the egress port. The same steps can also be carried out in the reverse direction where the southbound ports act as ingress ports and northbound ports act as egress ports. Furthermore, more of fewer FPUs and network security devices may be involved in the processing of a packet as defined by the flow tables programmed by the SDN controller.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A software-defined networking (SDN) switch comprising:
    a plurality of flow processing units (FPUs);
    a northbound interface coupled to a public network, a southbound interface coupled to a private network, a westbound interface and an eastbound interface coupled to a plurality of network security devices protecting the private network and the plurality of flow processing units (FPUs);
    one or more processors;
    one or more internal data storage devices operatively coupled to the one or more processors and having stored therein:
        a flow table installation module, which when executed by the one or more processors receives a plurality of flow tables from an SDN controller managing the SDN switch and stores the plurality of flow tables within the plurality of FPUs, wherein the plurality of flow tables contain software-defined rules defined by the SDN controller to cause a Service Function Chain (SFC) comprising an ordered set of security scanning, including a first type of security scanning and a second type of security scanning, to be applied to a particular network traffic session by causing the SDN switch to sequentially service the plurality of network security devices via physical data path chaining:
        a packet receive module, which when executed by the one or more processors causes the one or more processors to receive a packet associated with the particular network traffic session via an input port of the northbound interface;
        a first flow processing unit based packet processing module, which when executed by the one or more processors, forwards the packet to a first FPU selected from a first set of hardware-based FPUs of the plurality of FPUs, wherein the first set of hardware-based FPUs are of a first type that are configured to forward packets received from the northbound interface to the private network via the southbound interface or to one of the plurality of network security devices via the westbound interface or the eastbound interface;
        a first security device based packet processing module, which when executed by the one or more processors causes the first type of security scanning to be performed on the packet by obtaining a first forwarding decision regarding the packet by matching one or more portions of the packet against a first flow table of the plurality of flow tables that is associated with the first FPU and forwarding the packet to a first network security device of the plurality of network security devices via the westbound interface or the eastbound interface;
        a second flow processing unit based packet processing module, which when executed by the one or more processors when the packet has passed the first type of security scanning performed by the first network security device, receives the packet from the first network security device and selects a second FPU from a second set of hardware-based FPUs of the plurality of FPUs, wherein the second set of hardware-based FPUs are of a second type that are configured to forward packets received on the westbound interface or the eastbound interface to the private network via the southbound interface or to one of the plurality of network security devices via the westbound interface or the eastbound interface;
        a second security device based packet processing module, which when executed by the one or more processors causes the second type of security scanning to be performed on the packet by obtaining a second forwarding decision regarding the packet by matching one or more portions of the packet against a second flow table of the plurality of flow tables that is associated with the second FPU and forwarding the packet to a second network security device of the plurality of network security devices via the westbound interface or the eastbound interface; and
        a third flow processing unit based packet processing module, which when executed by the one or more processors when the packet has passed the second type of security scanning performed by the second network security device, receives the packet from the second network security device and selects a third FPU from the second set of hardware-based FPUs of the plurality of FPUs, wherein the third FPU forwards the packet to the private network via an outbound port of the southbound interface by obtaining a third forwarding decision regarding the packet by matching the one or more portions of the packet against a third flow table of the plurality of flow tables that is associated with the third FPU.

2. The SDN switch of claim 1, wherein the first FPU, the second FPU, and the third FPU comprise Field Programmable Gateway Array (FPGA) based processing units.

3. The SDN switch of claim 1, wherein the first security device and the second security device are selected from any or a combination of an Intrusion Prevention System (IPS), Intrusion Detection System (IDS), a gateway device, a firewall, and a Distributed Denial of Service (DDoS) prevention device.

4. The SDN switch of claim 1, wherein each of the first security device and the second security device are mapped for packet processing to one of the plurality of FPUs in a round robin manner.

5. The SDN switch of claim 1, wherein each of the first security device and the second security device are mapped for packet processing to one of the plurality of FPUs based on a relative processing load each of the plurality of FPUs.

6. A method of processing packets received by a by a software defined networking (SDN) switch, wherein the SDN switch includes a northbound interface coupled to a public network, a southbound interface coupled to a private network, a westbound interface and an eastbound interface coupled to a plurality of network security devices protecting the private network and a plurality of flow processing units (FPUs), the method comprising:
    for a particular network traffic session, causing, by the SDN switch, a Service Function Chain (SFC) comprising an ordered set of security scanning, including a first type of security scanning and a second type of security scanning, to be applied to the particular network traffic session by sequentially servicing the plurality of network security devices via physical data path chaining provisioned in a form of a plurality of flow tables containing software-defined rules by an SDN controller managing the SDN switch, including:

receiving, by the SDN switch, a packet associated with the particular network traffic session via an input port of the northbound interface;

forwarding, by the SDN switch, the packet to a first FPU selected from a first set of hardware-based FPUs of the plurality of FPUs, wherein the first set of hardware-based FPUs are of a first type that are configured to forward packets received from the northbound interface to the private network via the southbound interface or to one of the plurality of network security devices via the westbound interface or the eastbound interface;

causing, by the first FPU, the first type of security scanning to be performed on the packet by obtaining a first forwarding decision regarding the packet by matching one or more portions of the packet against a first flow table of the plurality of flow tables that is associated with the first FPU and forwarding the packet to a first network security device of the plurality of network security devices via the westbound interface or the eastbound interface;

when the packet has passed the first type of security scanning performed by the first network security device, receiving the packet from the first network security device by a second FPU that is selected from a second set of hardware-based FPUs of the plurality of FPUs, wherein the second set of hardware-based FPUs are of a second type that are configured to forward packets received on the westbound interface or the eastbound interface to the private network via the southbound interface or to one of the plurality of network security devices via the westbound interface or the eastbound interface;

causing, by the second FPU, the second type of security scanning to be performed on the packet by obtaining a second forwarding decision regarding the packet by matching the one or more portions of the packet against a second flow table of the plurality of flow tables that is associated with the second FPU and forwarding the packet to a second network security device of the plurality of network security devices via the westbound interface or the eastbound interface;

when the packet has passed the second type of security scanning performed by the second network security device, receiving the packet from the second network security device by a third FPU that is selected from the second set of hardware-based FPUs; and causing, by the third FPU, the packet to be forwarded to the private network via an outbound port of the southbound interface by obtaining a third forwarding decision regarding the packet by matching the one or more portions of the packet against a third flow table of the plurality of flow tables that is associated with the third FPU.

7. The method of claim 6, wherein the first FPU, the second FPU, and the third FPU comprise Field Programmable Gateway Array (FPGA) based processing units.

8. The method of claim 6, wherein the first security device and the second security device are selected from any or a combination of an Intrusion Prevention System (IPS), Intrusion Detection System (IDS), a gateway device, a firewall, and a Distributed Denial of Service (DDoS) prevention device.

9. The method of claim 6, wherein each of the first security device and the second security device are mapped for packet processing to one of the plurality of FPUs in a round robin manner.

10. The method of claim 6, wherein each of the first security device and the second security device are mapped for packet processing to one of the plurality of FPUs based on a relative processing load each of the plurality of FPUs.

\* \* \* \* \*